United States Patent
Wang et al.

(10) Patent No.: US 9,303,850 B2
(45) Date of Patent: Apr. 5, 2016

(54) BACKLIGHT FRAME, BACKLIGHT STRUCTURE AND LCD DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zijian Wang, Beijing (CN); Huanyu Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/491,453

(22) Filed: Sep. 19, 2014

(65) Prior Publication Data
US 2015/0260380 A1 Sep. 17, 2015

(30) Foreign Application Priority Data
Mar. 12, 2014 (CN) .......................... 2014 1 0090207

(51) Int. Cl.
*F21V 7/04* (2006.01)
*F21V 21/00* (2006.01)
*G02F 1/1333* (2006.01)

(52) U.S. Cl.
CPC .......... *F21V 21/00* (2013.01); *G02F 1/133308* (2013.01); *G02F 2001/13332* (2013.01); *G02F 2001/133322* (2013.01)

(58) Field of Classification Search
CPC .............. F21V 21/00; G02F 1/133308; G02F 2001/13332
USPC .............. 362/633, 632, 97.1, 97.2, 97.3, 600; 349/58
See application file for complete search history.

(56) References Cited

U.S. PATENT DOCUMENTS

| | | | |
|---|---|---|---|
| 9,110,214 B2* | 8/2015 | Lee | G02F 1/133308 |
| 2003/0147023 A1* | 8/2003 | Kang | G02F 1/133308 349/58 |

(Continued)

FOREIGN PATENT DOCUMENTS

| | | | |
|---|---|---|---|
| CN | 1504802 A | 6/2004 | |
| CN | 102243392 A | 11/2011 | |

(Continued)

OTHER PUBLICATIONS

First Office Action regarding Chinese application No. 201410090207.2, dated Dec. 14, 2015. Translation provided by Dragon Intellectual Property Law Firm.

*Primary Examiner* — Anh Mai
*Assistant Examiner* — Glenn Zimmerman
(74) *Attorney, Agent, or Firm* — Harness, Dickey & Pierce, P.L.C.

(57) ABSTRACT

The present invention discloses a backlight frame, a backlight structure and an LCD display device, the backlight frame comprises: a frame body and a plurality of limiting structures disposed outside the frame body, one end of the limiting structure is connected to the frame body detachably, the other end of the limiting structure is provided with a limiting portion, a limiting face of the limiting portion and a side surface of the frame body are coplanar, and the limiting face of the limiting portion is disposed above the side surface of the frame body. By detachably disposing limiting structure on frame body of backlight frame and limiting display element formed on frame body with limiting structure when assembling, contraposition installation can be achieved accurately, operator operation can be facilitated. Limiting structure is disposed detachably, thereby width of frame body is not increased, and it satisfies narrow bezel design requirement.

16 Claims, 4 Drawing Sheets

(56) References Cited

U.S. PATENT DOCUMENTS

| | | | | |
|---|---|---|---|---|
| 2004/0109104 A1* | 6/2004 | Lee | G02F 1/133308 | 349/58 |
| 2008/0007971 A1* | 1/2008 | Hsieh | G02F 1/133608 | 362/633 |
| 2008/0291356 A1* | 11/2008 | Kim | G02F 1/133615 | 349/58 |
| 2011/0199554 A1* | 8/2011 | Isami | G02F 1/13452 | 349/58 |
| 2014/0146523 A1* | 5/2014 | Wang | H05K 5/02 | 362/97.1 |

FOREIGN PATENT DOCUMENTS

| | | |
|---|---|---|
| CN | 102819122 A | 12/2012 |
| CN | 202948223 U | 5/2013 |
| JP | 2006330230 A | 12/2006 |
| TW | 545611 U | 8/2003 |

* cited by examiner

BACKLIGHT FRAME, BACKLIGHT STRUCTURE AND LCD DISPLAY DEVICE

CROSS REFERENCE TO RELATED APPLICATION

The present application claims a priority of the Chinese patent application No. 201410090207.2 filed on Mar. 12, 2014, which is incorporated herein by reference in its entirety.

TECHNICAL FIELD

The present invention relates to the field of display technology, especially relates to a backlight frame, a backlight structure and an LCD display device.

BACKGROUND

In general, a structure of an LCD display device having a glass substrate with retaining walls all around is shown in FIG. 1, as we can see when assembling a backlight structure, disposing a reflector plate 6 on one side of a light guide plate 4, disposing an optical membrane material 3 on the other side, disposing a frame body 5 outside the light guide plate 4a and the optical membrane material 3, disposing a shielding adhesive tape 2 above the frame body 5, the shielding adhesive tape 2 shielding the engagement location between the optical membrane material 3 and the frame body 5, and placing a glass substrate 1 above the shielding adhesive tape 2. In order to facilitate the assembling of the shielding adhesive tape 2, the glass substrate 1 and the reflector plate 6, retaining wall structures 51 as shown in FIG. 2 are disposed respectively above and below the frame body 5, so as to provide limit when placing the shielding adhesive tape 2, the glass substrate 1 and the reflector plate 6. The assembling of the backlight and the LCD display device is facilitated by adopting these retaining wall structures. If the LCD display device has an iron frame component, the retaining wall structures 51 also can be disposed on the iron frame component.

Currently, an important development trend of the LCD display device such as mobile phone, Tablet PC and TV are designed in narrow bezel, a common narrow bezel product is shown in FIG. 3, in which the length and width dimensions of the glass substrate 1 are slightly smaller than the length and width dimensions of the backlight comprised of the light guide plate 4 and the optical membrane material 3, the difference is normally about 0.1 mm, at this time, the retaining wall structures 51 can not be molded on the frame body 5, as shown in FIG 4.

However, the kind of narrow bezel product without retaining wall on the frame body needs to be assembled by auto line contraposition or using special fixture in the assembling process, which increases the complexity and the cost, but if adopting manual assembling, it has problems of low accuracy and high demand on the operator.

SUMMARY

Problems to Be Solved

The technology problem of the present invention to be solved is to realize accurate contraposition assembling of a backlight and an LCD display device of a narrow bezel display apparatus.

Technical Solutions

For the purpose of solving the above mentioned technology problems, an embodiment of the present invention provides a backlight frame, which comprises: a frame body and a plurality of limiting structures disposed outside the frame body, one end of the limiting structure is connected to the frame body detachably, the other end of the limiting structure is provided with a limiting portion, a limiting face of the limiting portion and a side surface of the frame body are coplanar, and the limiting face of the limiting portion is disposed above the side surface of the frame body.

Alternatively, the limiting structure is connected detachably to the frame body by a connection portion.

Alternatively, two connection portions are provided.

Alternatively, the connection portion is in L shape or the connection portions are in L shape.

Alternatively, the limiting face of the limiting portion is a corner face provided in right angle and disposed above the corner of the frame body.

Alternatively, the limiting portion is in L shape.

Alternatively, four limiting portions are provided.

Alternatively, the limiting portion comprises two corner plates, which are connected to two connection portions respectively.

Alternatively, the frame body is provided with a groove, one end of the limiting structure is connected into the groove.

Alternatively, the limiting structure and the frame body are molded integrally.

Alternatively, one end of the limiting structure is pasted to the frame body in a detachable connection.

An embodiment of the present invention also provides a backlight structure, comprising a backlight frame and display elements disposed in the backlight frame, in which the backlight frame is any one of the above mentioned backlight frame.

An embodiment of the present invention further provides an LCD display device, comprising the above mentioned backlight structure.

Technical Effects

The above mentioned technology solution has the following advantages: by means of detachably disposing limiting structure on the frame body of the backlight frame, and limiting the display element which needs to be formed on the frame body with the limiting structure when assembling, not only the contraposition installation can be achieved accurately, but also the operation of the operator can be facilitated. The limiting structure is disposed detachably, thereby the width of the frame body is not increased, and it can satisfy the narrow bezel design requirement.

Figure 1:
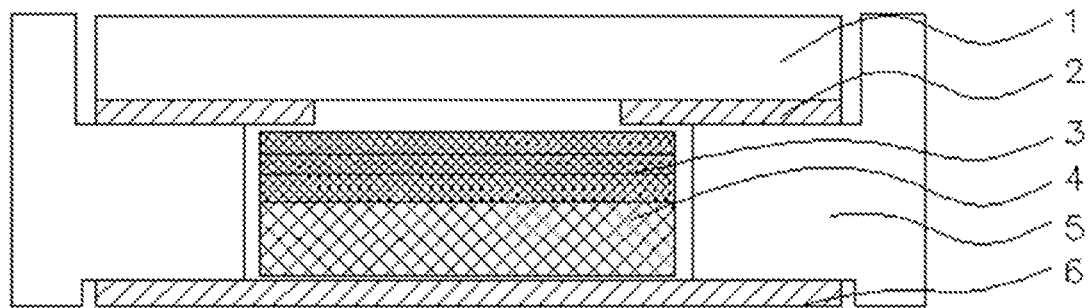
FIG. 1 shows a schematic structural view of an LCD display device having a glass substrate with retaining walls all around in the prior art.
Figure 2:
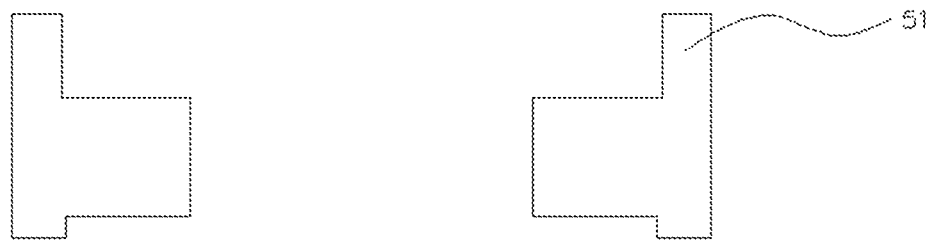
FIG. 2 shows a schematic structural view of an backlight frame having a glass substrate with retaining walls all around in the prior art.
Figure 3:
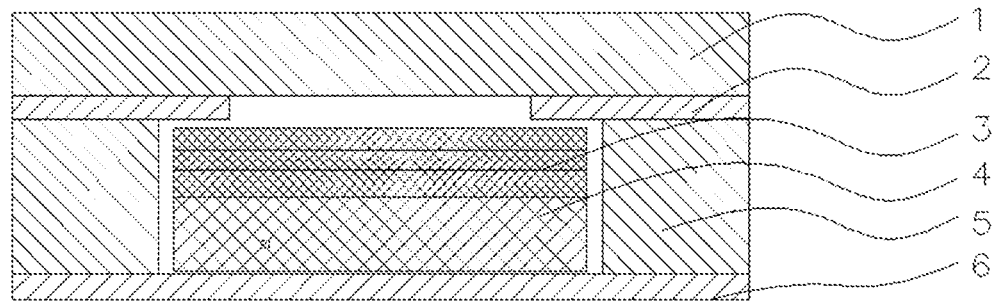
FIG. 3 shows a schematic structural view of an narrow bezel LCD display device having a glass substrate without retaining wall all around in the prior art.
Figure 4:
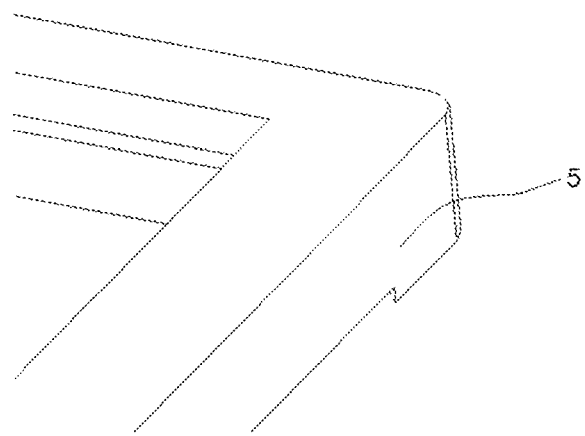
FIG. 4 shows a schematic structural view of an backlight frame having a glass substrate without retaining wall all around in the prior art.

1: glass substrate; 2: shielding adhesive tape; 3: optical membrane material; 4: light guide plate; 5: frame body; 51: retaining wall structure; 52: limiting structure; 521: connection portion; 522: limiting portion; 523: bezel ; 6: reflector plate.

DETAILED DESCRIPTION

The detailed implementation will be described below referring to the drawings and the embodiments. The following embodiments are used to illustrate the present invention but not used to limit the scope of the present invention.

In order to have accurate contraposition when assembling the reflector plate, shielding adhesive tape or the glass substrate in the backlight structure and the backlight frame body, and avoid the influence to the narrow bezel structure of the display device by the retaining wall structure, the present invention designs a backlight frame, which comprises: a frame body and a plurality of limiting structures disposed outside the frame body, one end of the limiting structure is connected to the frame body detachably, the other end of the limiting structure is provided with a limiting portion, a limiting face of the limiting portion and a side surface of the frame body are coplanar, and the limiting face of the limiting portion is disposed above the side surface of the frame body. By means of the backlight frame, the reflector plate, the shielding adhesive tape or the glass substrate can be placed directly in the space surrounded by the limiting structures when assembling the reflector plate, the shielding adhesive tape or the glass substrate and the frame body. Because the limiting face of the limiting structure and the side surface of the frame body are coplanar, the end face shape of the space surrounded by the limiting face is consistent with the shape of the surface of the frame body, and is also consistent with the peripheral shape of the location where the reflector plate, the shielding adhesive tape or the glass substrate provided, thus the assembling process is greatly simplified, and when the assembling process is finished, the limiting structure can be detached by disassembly, so that the backlight structure designed in narrow bezel is not influenced.

Figure 5:
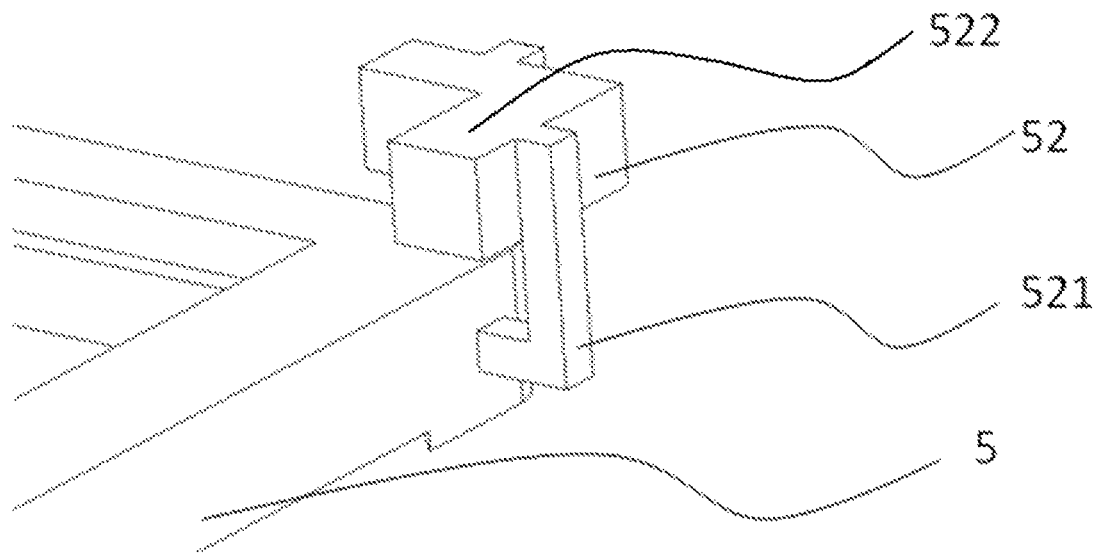
FIG. 5 shows a schematic structural view of a novel backlight frame according to the present invention.
Figure 6:
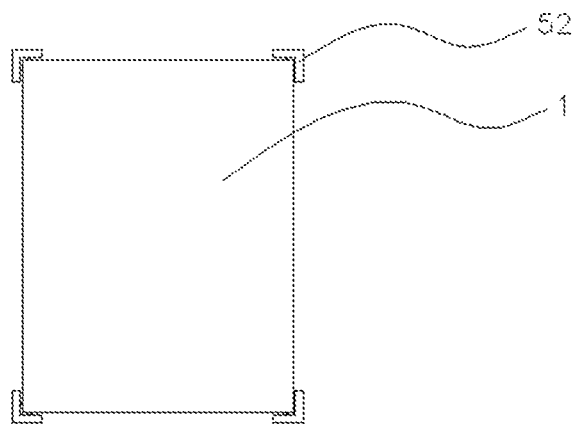
FIG. 6 shows a schematic view viewed along the horizontal direction when assembling the glass of the backlight frame structure according to the present invention.
Figure 7:
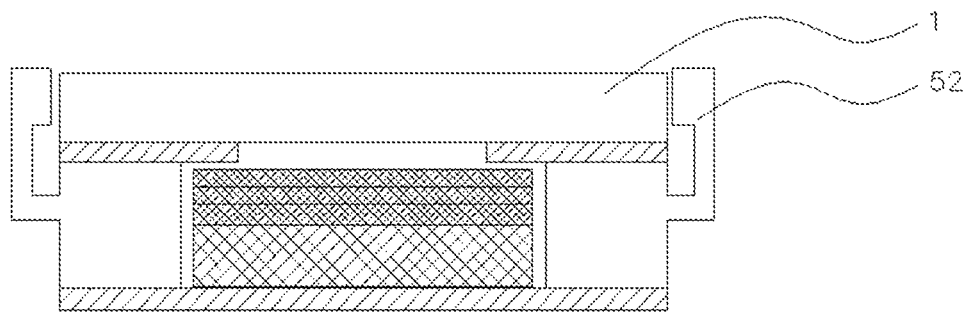
FIG. 7 shows a cross-portional view of the FIG. 6.

Referring to FIGS. 5-7, showing a schematic structural view of a backlight frame according to the present invention, and a schematic structural view viewed along the horizontal direction when assembling the glass substrate of the backlight frame structure and a cross-portional view thereof respectively. In the backlight frame, one end of a limiting structure 52 is a connection portion 521, the other end of the limiting structure 52 is a limiting portion 522, the connection portion 521 is connected to the side surface of the frame body 5 detachably. The connection portion 521 may be in L shape, and two connection portions 521 may be provided, one end portion of the connection portion 521 is connected to the frame body 5, the other end portion of the connection portion 521 is connected to the limiting portion 522, the limiting portion 522 also may be in L shape, the corner of the "L" shaped structure is the right angle corner of the above mentioned limiting face, the inner surface of the corner of the "L" shaped structure is the limiting face which is disposed in right angle, the limiting face is located above the corner of the frame body 5, the two corner plates of the limiting portion 522 may be connected to one connection portion 521 respectively, and the two connection portions 521 are connected to two side faces of the frame body 5 respectively, accordingly the stability of the limiting portion 522 can be enhanced.

Wherein four limiting portions 522 can be provided which are disposed at the four corners of the frame body 5 respectively, the limiting portion 522 is mainly used for positioning and guiding, so that the operator can perform contraposition assembling each display members, such as the reflector plate, the shielding adhesive tape and the glass substrate, rapidly and accurately during assembling.

The limiting structure 52 in the embodiment can be formed integrally with the frame body 5 by injection molding, as long as the limiting structure 52 and the frame body 5 can be separated by mechanical equipment or manual operation of the assemblers after each display members such as the reflector plate are assembled. The connection portion 521 of the limiting structure 52 also can be pasted to the frame body 5, thereby the connection strength between the limiting structure 52 and the frame body 5 can be guaranteed and the detachment of the limiting structure 52 can be facilitated.

Figure 8:
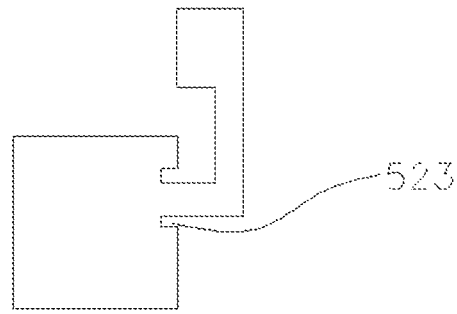
FIG. 8 and FIG. 9 show schematic views of a preferred form of a novel backlight frame structure according to the present invention.
Figure 9:
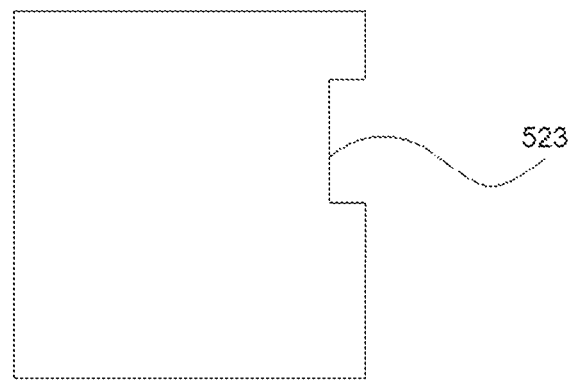

Referring to FIG. 8 and FIG. 9, showing a preferred implementation, specifically, a groove 523 is disposed at the connecting position between the connection portion 521 and the frame body 52, one end of the connection portion 521 is connected into the groove 523. The main purpose of the groove 523 is to avoid forming of projection from portion of material leaved after detaching the connection portion 521, this harms the assembling of the backlight frame structure when forming a display device.

The backlight frame structures as shown in FIGS. 5-9 are suitable for the assembling of the shielding adhesive belt and/or glass substrate and the frame body, when assembling the reflector plate, the limiting portion of the limiting structure can be disposed on one side of the reflector plate.

Based on the above mentioned backlight frame, the present invention further provides a backlight structure and an LCD display device, in which the backlight structure comprises the above mentioned backlight frame; the LCD display device comprises the above mentioned backlight structure and a backlight module. The backlight structure is described above, the structures of another parts of the LCD display device can be referred to the prior art, which will not be described in detail herein. The LCD display device can be any products or components having display functions such as LCD panel, electronic paper, LCD TV, LCD display, digital photo frame, mobile phone, panel computer and so on.

It can be seen from the above embodiments, in the present invention, by means of detachably disposing limiting structure on the frame body of the backlight frame, and limiting the display element which needs to be formed on the frame body with the limiting structure when assembling, not only the contraposition installation can be achieved accurately, but also the operation of the operator can be facilitated. The limiting structure is disposed detachably, thereby the width of the frame body is not increased, and it can satisfy the narrow bezel design requirement.

The above mentioned is just preferred implements of the present invention, it should be pointed out that improvement and replacement also can be made under the premise of without separating from the technical principle of the present invention to those skilled in the art, and these improvement and replacement should be seen as the protection scope of the present invention as well.

What is claimed is:

1. A backlight frame, comprising:
a frame body and a plurality of limiting structures disposed outside the frame body, one end of the limiting structure is connected to the frame body detachably, the other end of the limiting structure is provided with a limiting portion, a limiting face of the limiting portion comprises two surfaces forming a right angle, the two surfaces of the limiting face are respectively coplanar with two adjacent lateral surfaces of the frame body, and the limiting face of the limiting portion is disposed above the adjacent lateral surfaces of the frame body.

2. The backlight frame according to claim 1, wherein the limiting structure is connected detachably to a lateral surface of the frame body by a connection portion.

3. The backlight frame according to claim 1, wherein the limiting portion is in L shape.

4. The backlight frame according to claim 1, wherein four limiting portions are provided at four corners of the frame body.

5. The backlight frame according to claim 1, wherein the frame body is provided with a groove at lateral surfaces, one end of the limiting structure is connected into the groove.

6. The backlight frame according to claim 1, wherein the limiting structure and the frame body are molded integrally.

7. The backlight frame according to claim 1, wherein one end of the limiting structure is pasted to the frame body in a detachable connection.

8. A backlight structure, comprising the backlight frame according to claim 1.

9. The backlight frame according to claim 1, wherein the limiting face of the limiting portion is spaced from the adjacent lateral surfaces of the frame body in a direction from a bottom surface of the frame body to a top surface of the frame body.

10. The backlight frame according to claim 2, wherein each of the plurality of limiting structures are provided with two connection portions, and the two connection portions are respectively connected to two adjacent lateral surfaces of the frame body.

11. The backlight frame according to claim 2, wherein the connection portion of each limiting structure is in L shape.

12. An LCD display device, comprising the backlight structure according to claim 8.

13. The backlight frame according to claim 10, wherein the connection portions of each limiting structure are in L shape.

14. The backlight frame according to claim 10, wherein the limiting portion comprises two corner plates, which are connected to the two connection portions respectively.

15. The backlight frame according to claim 11, wherein the connection portion comprises two sections forming L shape, one of the two sections is arranged perpendicular to the lateral surface of the frame body and is connected to the lateral surface of the frame body, and the other of the two sections is connected to the limiting portion.

16. The backlight frame according to claim 5, wherein the limiting structure is connected detachably to a lateral surface of the frame body by a connection portion, the connection portion comprises two sections forming L shape, one of the two sections is arranged perpendicular to the groove, connected into the groove and have a length larger than a depth of the groove, and the other of the two sections is connected to the limiting portion.

* * * * *